Aug. 11, 1970   B. I. BARNES   3,523,398
METHOD AND APPARATUS FOR SEALING CARTONS
Filed Sept. 12, 1968   7 Sheets-Sheet 1

INVENTOR.
BAYARD I. BARNES
BY Dominik, Knechtel & Jodula
ATTYS.

INVENTOR.
BAYARD I. BARNES

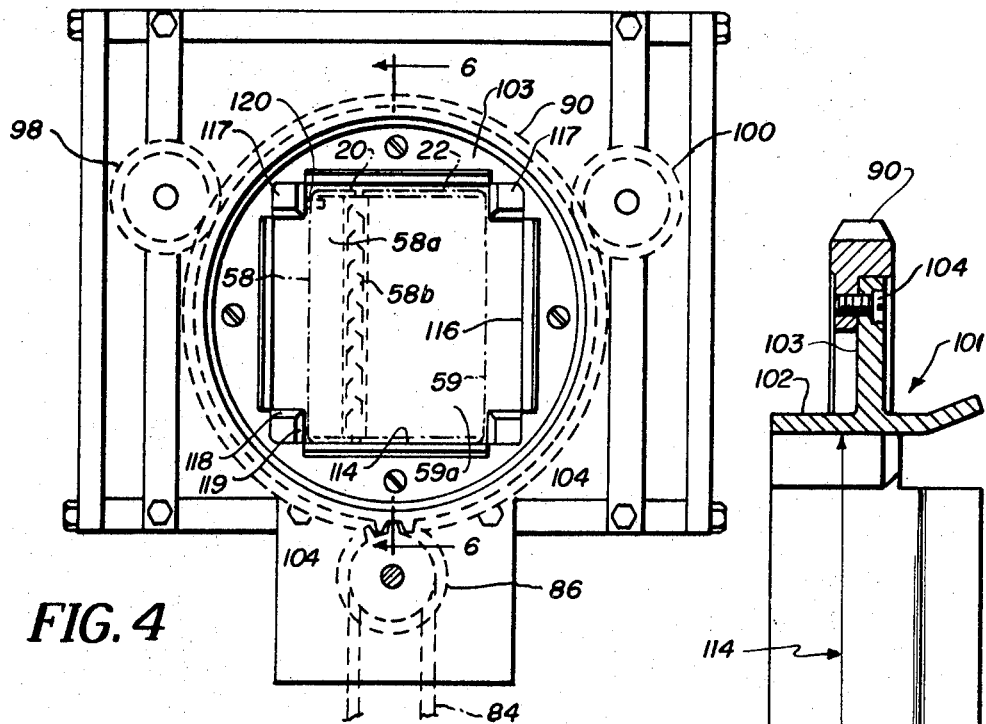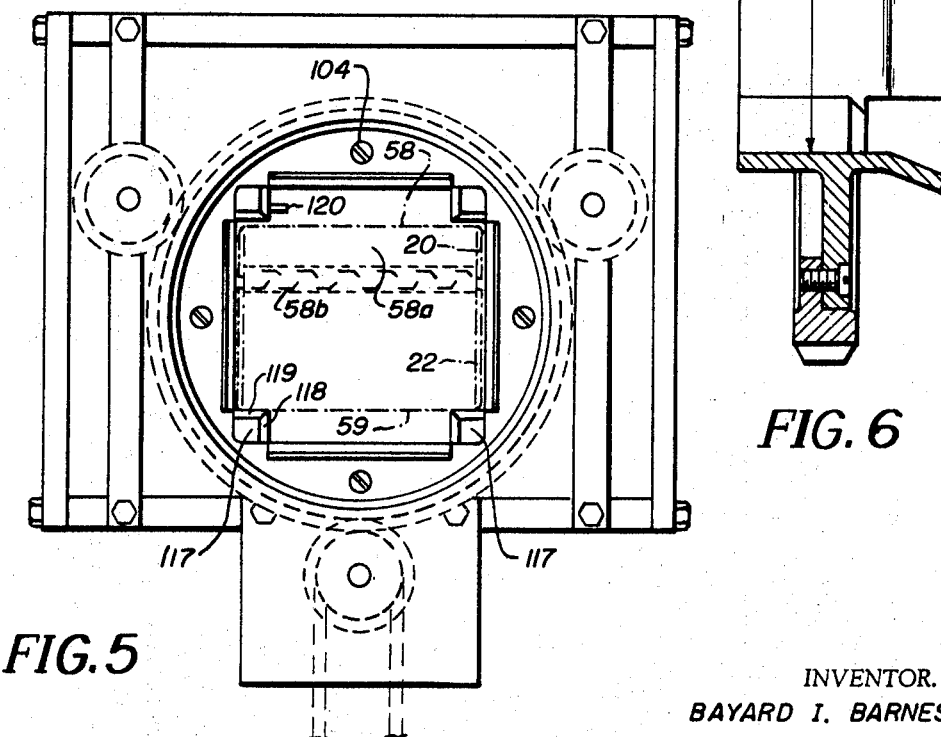

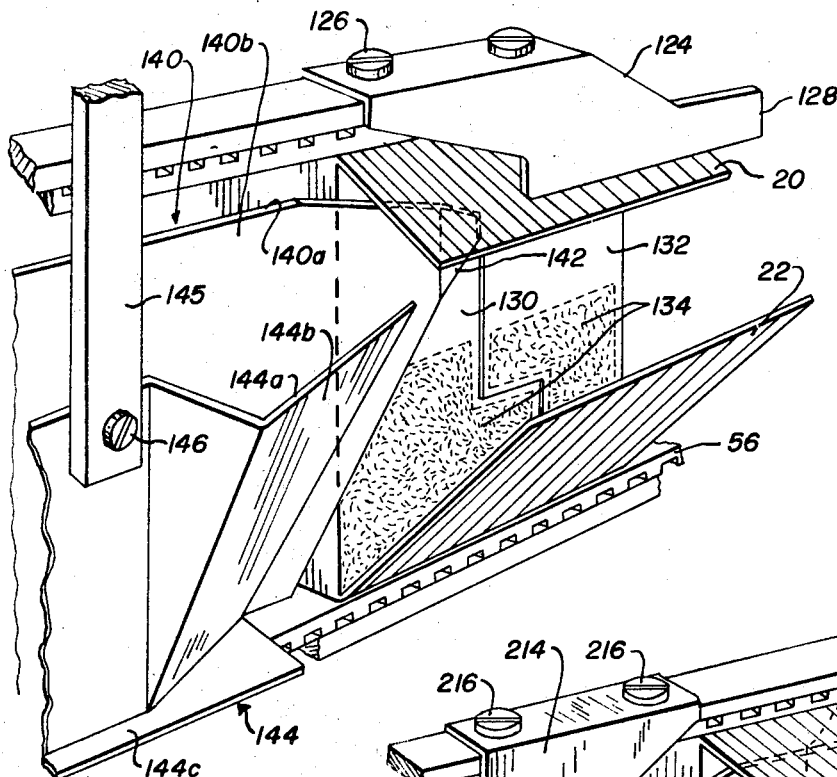
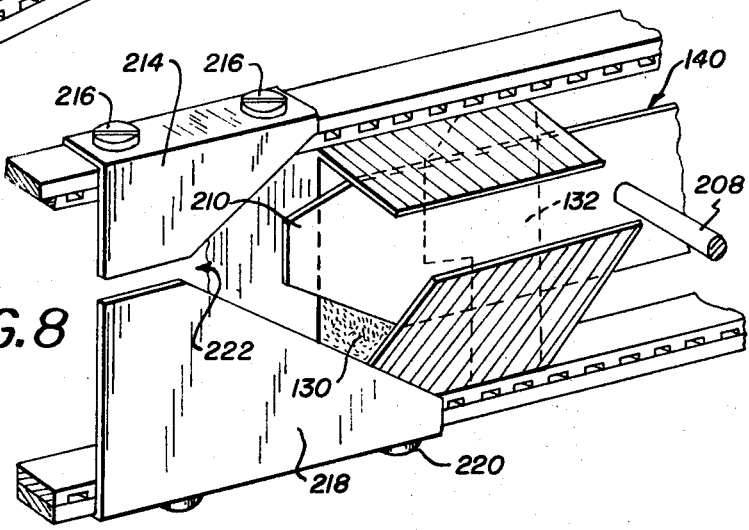
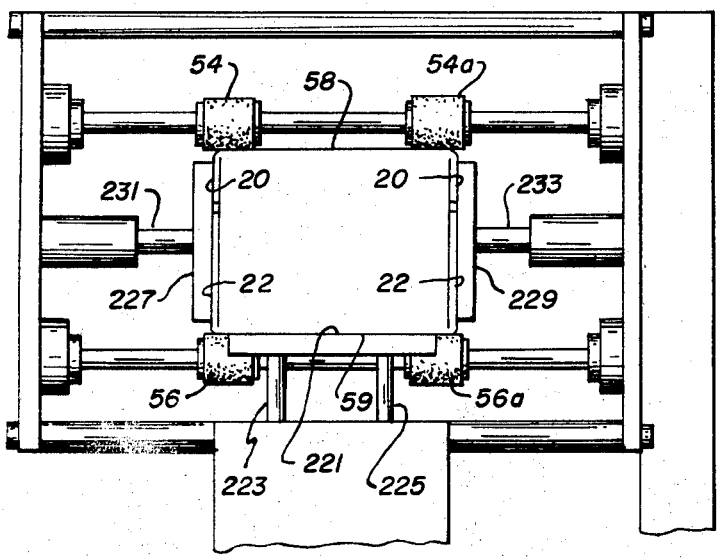

Aug. 11, 1970     B. I. BARNES     3,523,398
METHOD AND APPARATUS FOR SEALING CARTONS
Filed Sept. 12, 1968     7 Sheets-Sheet 6
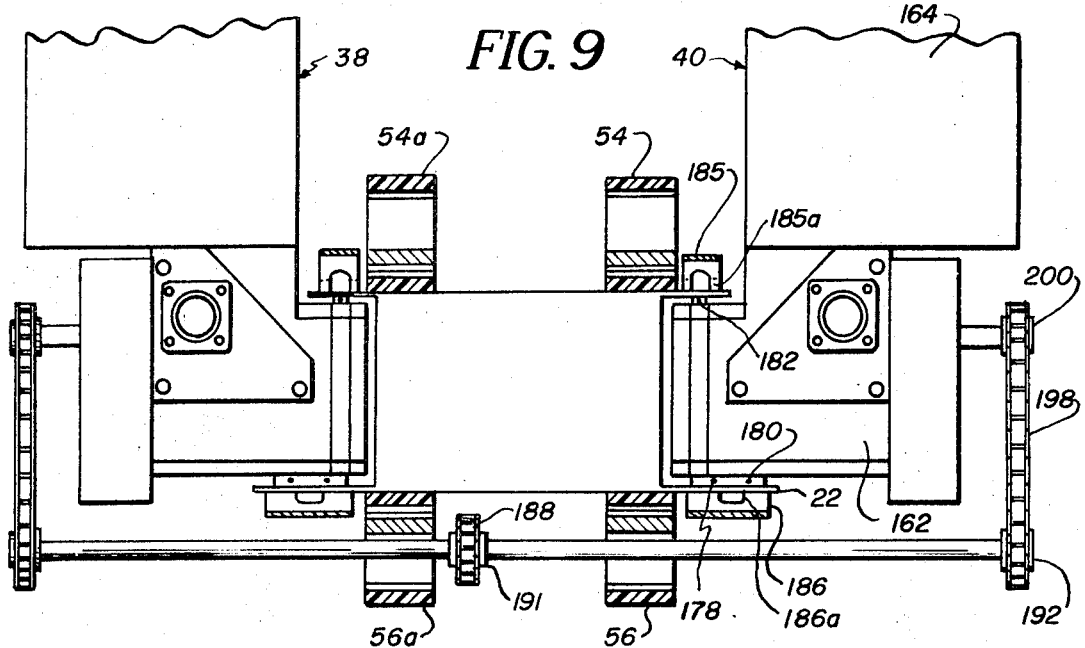
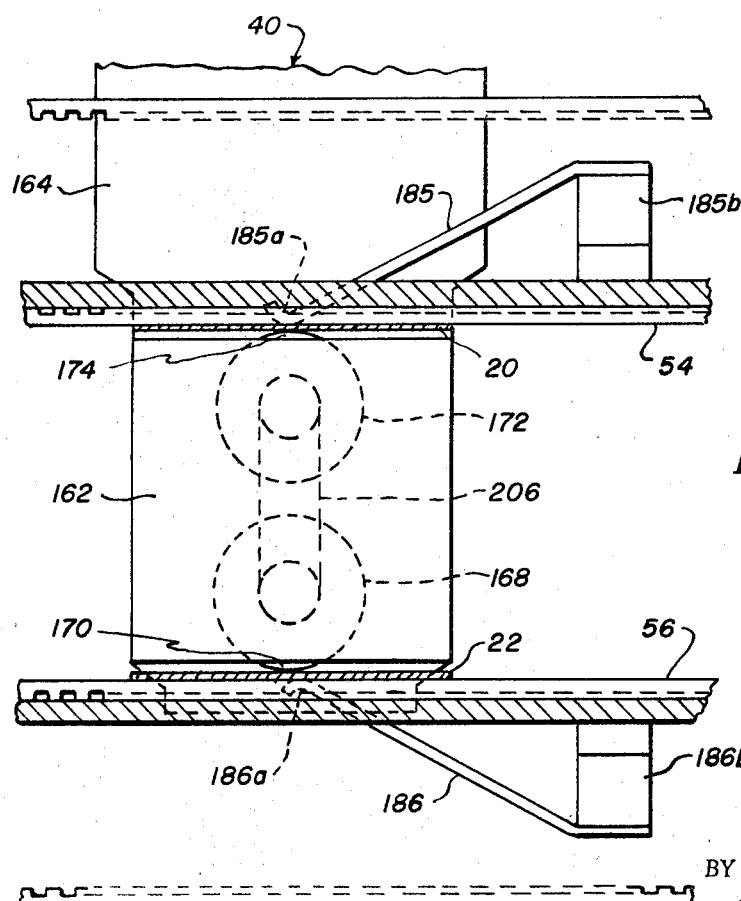
INVENTOR.
BAYARD I. BARNES
BY
*Dominik, Knechtel & Godula*
ATTYS.

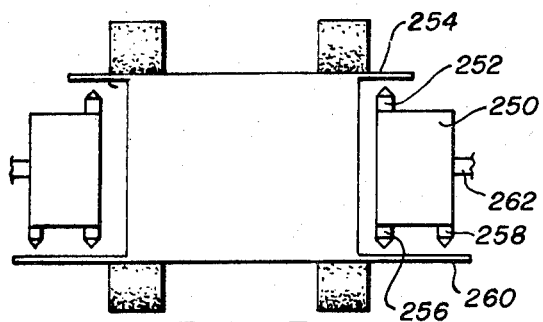
FIG.15
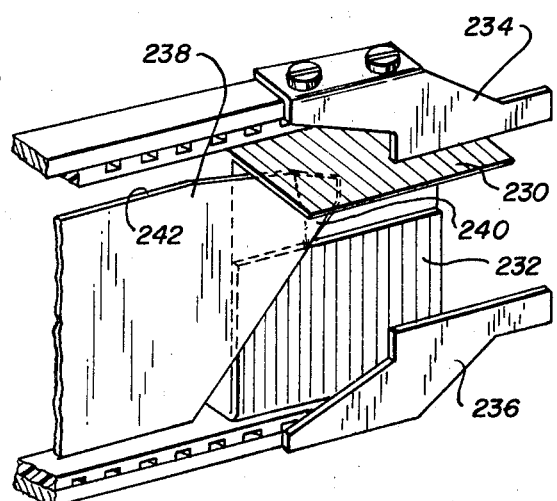
FIG.12
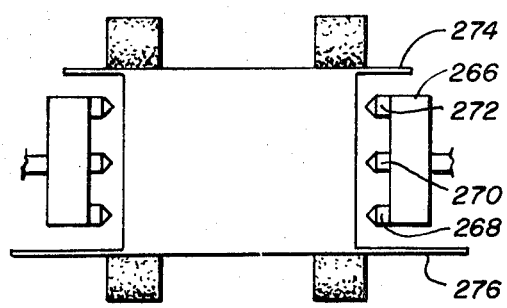
FIG.16
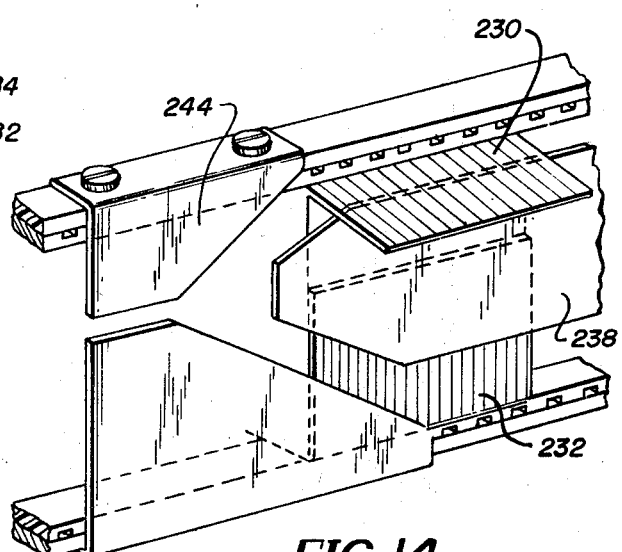
FIG.14
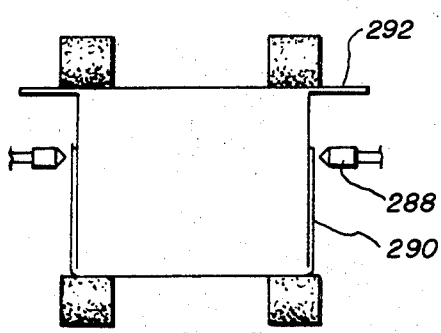
FIG.17
FIG.18
INVENTOR.
BAYARD I. BARNES
BY Dominik, Knechtel & Jodula
ATTYS.

United States Patent Office 3,523,398
Patented Aug. 11, 1970

3,523,398
METHOD AND APPARATUS FOR
SEALING CARTONS
Bayard I. Barnes, Oakland, Calif., assignor to The Finn Industries, Inc., Chicago, Ill., a corporation of Delaware
Filed Sept. 12, 1968, Ser. No. 759,406
Int. Cl. B65b 7/20
U.S. Cl. 53—47                21 Claims

ABSTRACT OF THE DISCLOSURE

A method for sealing closure flaps at opposite carton ends by receiving a vertically oriented carton with deposited contents, rotating the carton 90° to a horizontal position, plowing the end closure flaps open, applying continuous lines of bonding material to the inside flap surfaces, plowing the closure flaps closed, and compressing the carton end until the bonding material has set. An apparatus for the method includes a machine with a carton entry end, a ring to turn the carton 90°, an endless conveyor to advance the carton past flap opening plows, adhesive applicators, flap closing plows, and compression plates to hold the flaps until the bonding material has set.

---

This invention relates to a method and apparatus for sealing cartons, particularly ice cream cartons or the like.

This invention is concerned with paper board cartons of the type which have four side panels, one of which may be a top panel which functions as a reclosable lid. The opposite ends of such cartons have closure flaps which include side closure flaps, generally overlapping, and top and bottom closure flaps. The top and bottom closure flaps are generally of different sizes, with one major flap extending past the midline of the height of the carton and the other end flap being a minor flap which either terminates short of the midline, or extends thereover to overlap the end of the major flap. A reclosable lid on such cartons has a depending closure flap to be secured to the front panel of the carton. Such a depending closure flap may be provided with extending tabs at opposite ends which fold against the opposite ends of the carton and are tucked below and bonded to the top closure flaps. In such embodiments, the top end closure flaps become side depending skirt portions and the top panel depending closure flap becomes a front depending skirt portion. In other embodiments, the top closure flaps at opposite ends of the carton and the top panel depending closure flap may remain free of one another.

When such cartons are used for ice cream or the like, the carton is usually provided as a flat, folded assembly with a top panel having a depending front closure flap bonded to the front panel of the carton. Such a carton is erected by applying pressure to the remote edges of the folded carton, whereupon the central passageway of the carton is defined by the continuous side walls, said passageway being opened at the opposite ends when the end closure flaps are extended. Such cartons are filled by loosely folding one of the ends to closed position so that ice cream or the like may be deposited in a filling machine, such as an Anderson 55 or 555 filling machine. In general, the top is then closed by plow means in the filling machine. It will be appreciated that the bonding step is most efficiently and effectively attained with hot melt bonding materials which should be applied in ways which will not result in any disturbing temperature effects to the deposited ice cream. It will be further appreciated that the sealing of the ends of the carton should be attained in a rapid and economical manner with accurate and positive application of the hot melt bonding material without any of the foregoing disturbing temperature effects. It will be further appreciated that an apparatus would be desirable which can receive such cartons with deposited ice cream in a rapid manner wherein such hot melt bonding material is applied to the end closure flaps of the carton without incurring waste or encountering inaccuracies or the like in the deposition of the hot melt material. It will further be appreciated that such a method and apparatus should preferably lead to the application of the bonding material in as few manipulative steps as possible to reduce the complexity of any method or apparatus which is designed to obtain such sealing.

Cartons which are used for ice cream or the like are coated with wax or other film barriers to prevent leakage and attain desired packaging characteristics. To obtain the desired bonding, the end closure flaps, and other closure flaps, of such cartons have bonding areas which are uncoated so that the sealing may be effected following deposition of the hot melt material or other bonding materials. The art would welcome a method and apparatus which would allow the bonding material to be applied in improved ways to such uncoated bonding areas to effect a more efficient and effective sealing method.

In view of the foregoing, it is accordingly one important object of this invention to provide a method and apparatus for sealing the opposite ends of cartons in an improved manner.

Another important object of the invention is to provide a method and apparatus for sealing the opposite ends of generally rectangular cross-sectional cartons, which have been loaded so that said carton may be manipulated in an improved manner to apply bonding material and to close the end flaps.

Another important object is to provide a method and apparatus in which cartons, loaded with ice cream or the like, are manipulated in an improved manner to allow the closure flaps at the opposite ends to be opened substantially simultaneously so that bonding material is applied and the flaps are sealed in an improved manner.

Another important object of the invention is to provide a method and apparatus which seals the opposite ends of ice cream cartons or the like provided with a reclosable lid separably bonded to the front of the carton, said carton being rotated in the operation so that the end closure flaps may be opened, hot melt may be applied, and the end flaps may be closed in an improved manner.

Another important object is to provide a method and apparatus for sealing the opposite ends of ice cream cartons or the like by means which allow a high rate of carton movement through the sealing operation in an efficient and effective manner which permits a substantially simultaneous application of bonding material to seal the opposite ends of the carton.

Yet another important object is to provide a method and apparatus for sealing the opposite ends of ice cream cartons or the like in an efficient and effective manner which allows a high rate of carton movement through a sealing operation in a given period of time, and in which hot melt bonding material is applied in an improved way so that the lower temperature of the ice cream contents or the like participates in effecting an efficient seal of the end closure flaps.

It is still another important object to provide a method and apparatus for sealing the opposite ends of ice cream cartons or the like by utilizing the important step of rotating a vertically received carton to a horizontal position so that bonding material may be applied to the opposite ends of the carton in different ways while still enjoying the advantages of an improved sealing procedure.

A still further important object is to provide a method and apparatus for sealing the opposite ends of ice cream cartons or the like in which vertically oriented and loaded cartons are succeedingly received and rotated to a horizontal position without requiring resetting or the like of the receiving means to effect a subsequent rotation, and wherein said rotated cartons are continually advanced along a path in which the opposite closure flaps of the cartons are plowed into open position, bonding material is applied to the end of the cartons, such flaps are then plowed into closed position, and held in the closed position until the sealing operation is effected.

Objects such as the foregoing are attained in the practice of a method for sealing the opposite ends of cartons as will be disclosed herein. In brief, such method provides for delivering a vertically oriented carton loaded with deposited contents to a rotating station. The vertically oriented carton is delivered from a filling station where ice cream or the like has been deposited through the top open end formed by extending side, top, and bottom closure flaps which are plowed to a loosely closed position in the filling machine following the filling operation. The bottom of the carton also has its flaps loosely closed so that the deposited contents are held therein. At the rotating station, the carton is rotated substantially 90° to obtain a substantially horizontal orientation of the carton. In this position, the loosely closed top and bottom end flaps at the opposite ends of the carton are in position to be opened to substantially horizontal position. The horizontally oriented carton with the opened top and bottom flaps is bilaterally symmetrical. The side end flaps of the bilaterally symmetrical carton are held in closed position at both ends while bonding material, preferably hot melt adhesive, is applied in a substantially continuous line to the inside surfaces of the opened top and bottom closure flaps. The top and bottom flaps are then moved or plowed into closed positions, whereupon the continuous line of deposited hot melt material is set at a fast rate as a result of the lower temperature of the carton paperboard.

The objects recited herein are attained by the practice of the methods, briefly described above, and such objects are further attained by employing an apparatus to practice the invention such as that shown in the following disclosure, including drawings wherein:

FIG. 4 is a front elevational view, on an enlarged scale, along line 4—4 of FIG. 2, with parts removed and other parts indicated in dotted lines;

FIG. 5 is a front elevational view similar to FIG. 4, but showing the carton rotated to its substantially horizontal position;

FIG. 6 is a view along section line 6—6 of FIG. 4, on an enlarged scale, with parts removed for purposes of clarity;

FIG. 7 is a perspective view, on an enlarged scale, and with parts removed, showing plows secured to the housing for plowing the top and bottom closure flaps to open position and for holding the side closure flaps in closed position;

FIG. 8 is a view similar to FIG. 7, but on a slightly decreased scale, and with parts removed for purposes of clarity, showing other plows secured to the housing for moving the top and bottom closure flaps into closed position;

FIG. 9 is an end elevational view, partly in section, and with parts removed for purposes of clarity, showing the application of bonding material to the bilaterally symmetrical carton with its top and bottom closure flaps opened;

FIG. 10 is a side elevational view, somewhat diagrammatic, with parts removed for purposes of clarity, and with parts in section to show other features of the application of the bonding material to the outsides of the closure flaps;

FIG. 11 is an end elevational view looking towards the carton discharge end of the machine, with parts removed for purposes of clarity, showing means to compress the closed opposite end of the carton until the bonding material is set;

FIG. 12 is a perspective view in portion of an alternative embodiment for plowing to closed position a carton with a modified closure end;

FIG. 14 is a perspective view in portion showing plow closing means similar to the construction of FIG. 8, but employed to close the carton shown in FIG. 12;

FIG. 15 is a diagrammatic representation showing alternatively means for depositing bonding material to the outsides of cartons similar to those shown in FIGS. 1–11;

FIG. 16 is a diagrammatic representation showing alternative means for applying bonding material to the overlapped side closure flaps in a carton similar to the carton of FIG. 15;

FIG. 17 is a diagrammatic representation showing alternative means for applying bonding material to the inside surface of a flap in a carton similar to that shown in FIGS. 12–15; and FIG. 18 is a diagrammatic representation showing alternative means for applying bonding material to the outside surface of a flap in a carton similar to that shown in FIG. 11.

The use of the same numerals in the various views of the drawings will indicate a reference to the same structures and parts as the case may be.

Figure 1:
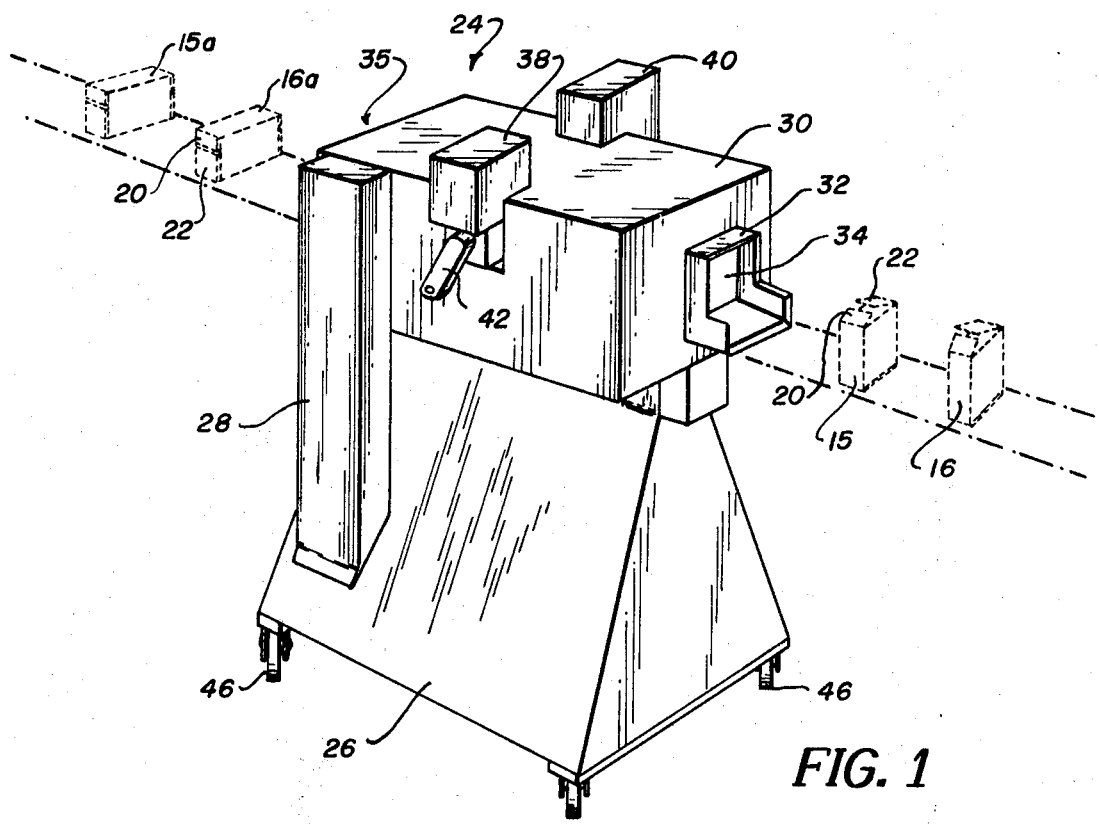
FIG. 1 is a perspective view of a machine useful in the method of sealing opposite ends of cartons.

Referring to FIG. 1, there is indicated in phantom a pair of vertically oriented cartons 15 and 16 being moved along a conveyor 18. The top and bottom closure flaps are shown in loosely closed position after having received deposited contents, such as ice cream from an Anderson ice cream filling machine. Such a carton has underlying side closure flaps, a top or minor closure flap 20 and a bottom or major closure flap 22. After passing through the sealing apparatus, indicated generally as 24, the cartons are discharged in substantially horizontal position as indicated at 15a and 16a. It will be seen that the top or minor closure flap 20 and the bottom or major closure flap 22 are closed and sealed.

Figure 3:
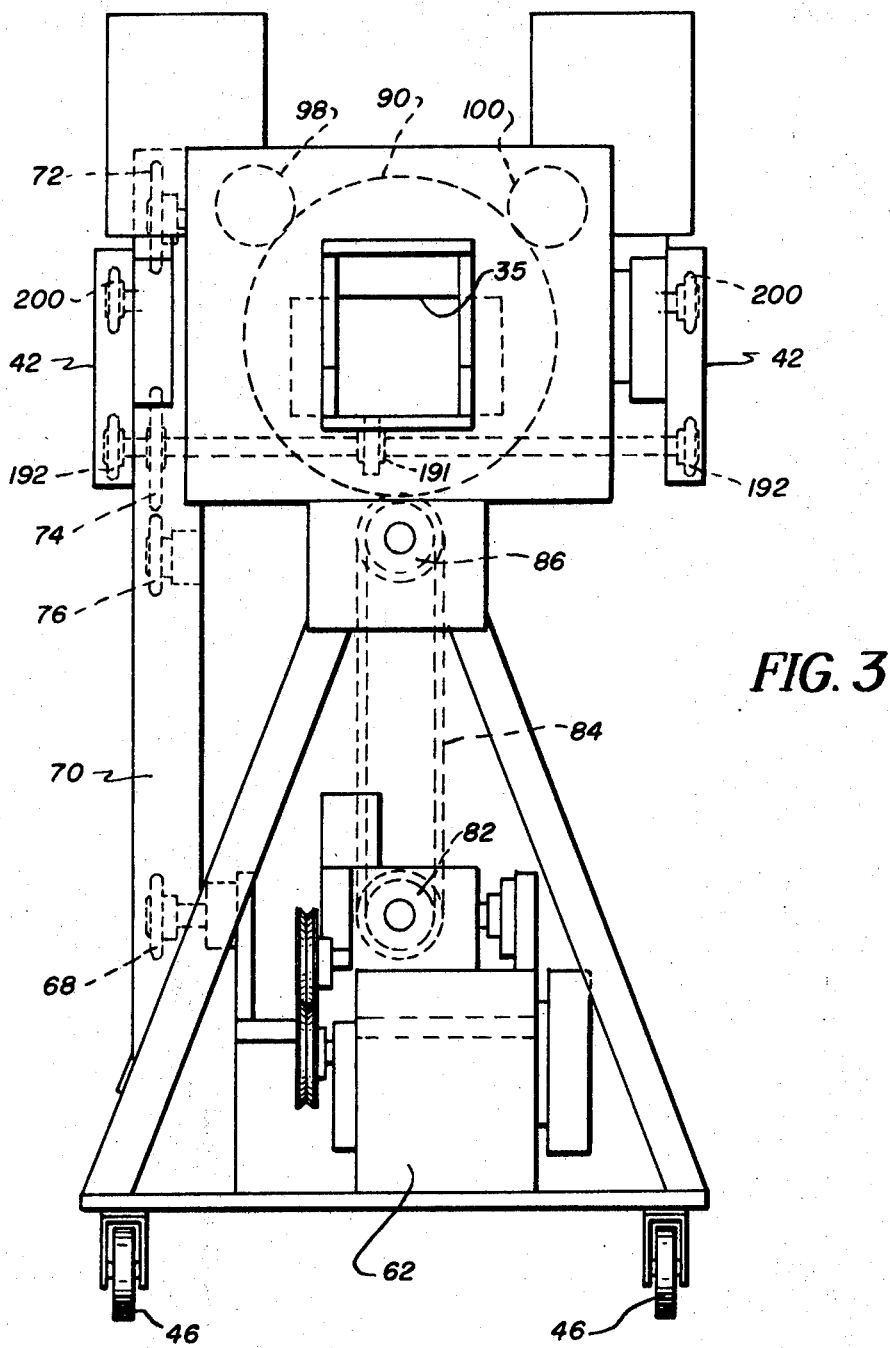
FIG. 3 is a front elevational view of the machine shown in FIG. 1, on a scale enlarged in the same way as FIG. 2, showing various parts in dotted lines.

The apparatus 24 includes a lower power housing 26, a drive housing 28, and an upper sealing housing 30. The vertically oriented cartons, such as 15 and 16, move to a carton entry 32 shown as a receiving member with a rectangular passageway 34 conforming to the configuration of the cartons 15 or 16. The sealed cartons leave the apparatus through a carton discharge 35, best seen in FIG. 3, which has a rectangular cross-section conforming to the dimensions of a horizontally oriented and sealed carton.

The perspective view of FIG. 1 also shows a pair of bonding material applicators or glue pots 38 and 40. A drive housing 42 is shown associated with glue pot 38, and it should be understood that a like drive housing will be disposed on the opposite side in association with glue pot 40.

Figure 2:
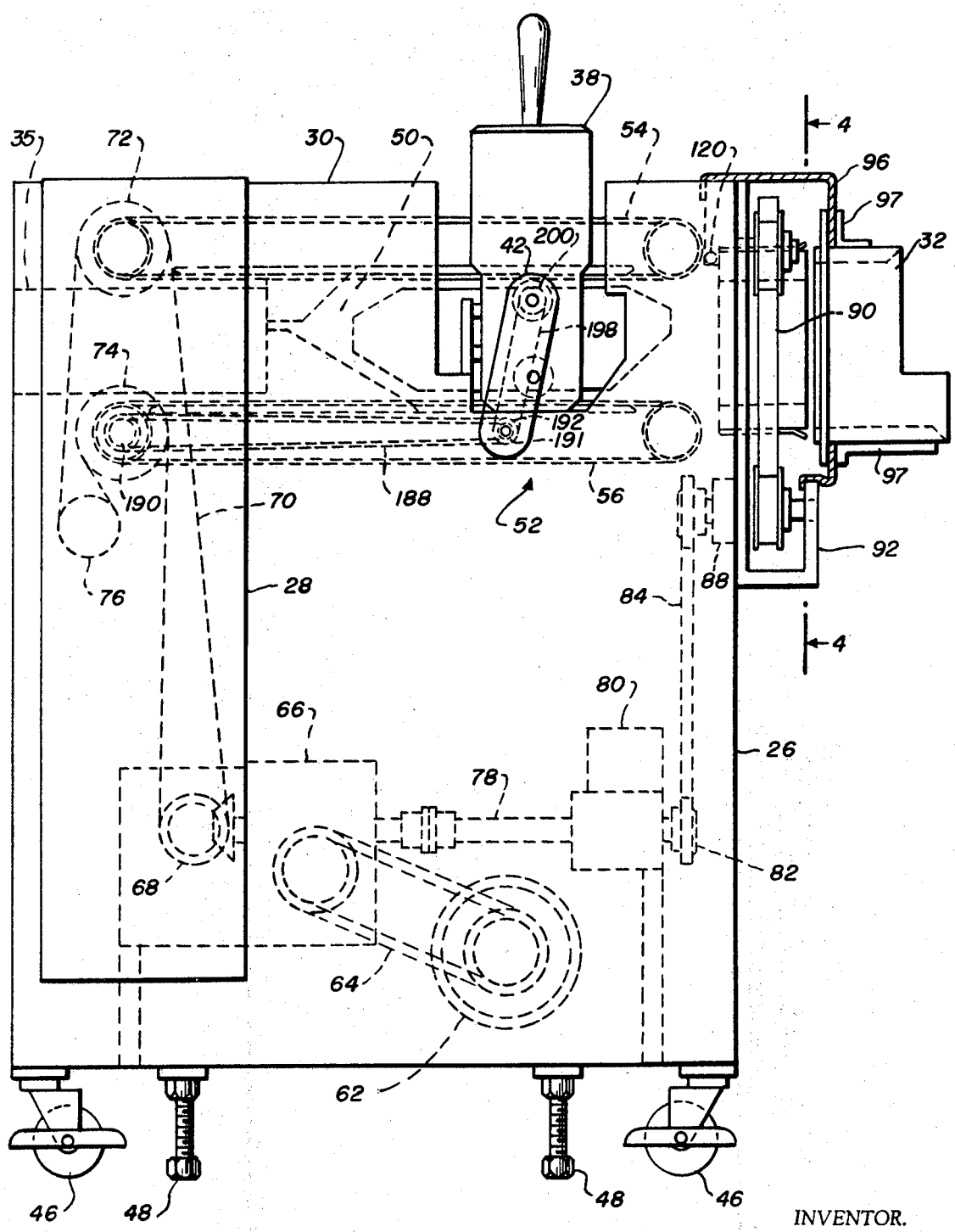
FIG. 2 is a side elevational view, on an enlarged scale, of the machine of FIG. 1, with various parts indicated in dotted lines.

Referring now to FIG. 2, the apparatus is shown as mobile with coasters 46. Adjustable screw jacks are also shown to selectively raise the height of the apparatus. A carton transit passageway 50 extends from the carton entry 34 to the carton discharge 35. An endless conveyor system shown generally as 52 extends throughout the carton transit passageway to convey and deposit the carton at a compression station towards the carton discharge end. The illustrated conveyor system includes an upper pair of endless belts 54 and 54a, and a lower pair of endless belts 56 and 56a (see FIG. 11). The belts are space apart a distance sufficient to make contact with the opposite side panels of the carton.

The conveyor and other elements of the apparatus are powered by a motor 62 which turns an endless drive chain 64 to operate gear box 66. Gear box 66 contains a rotating sprocket wheel 68 which turns endless chain 70 around sprockets 72 and 74 of the upper and lower conveyor systems, respectively, and around idler sprocket 76. Gear box 66 also rotates shaft 78 connected to gear box assembly 80, and driving sprocket 82 is turned by the train in the gear box 80 to drive chain 84 and driving gear 86 through gear box 88. Driving gear 86 is controlled by a one revolution clutch (not shown), and gear 86 meshes with ring gear 90 disposed in ring gear housing 92. The carton entry member 32 is mounted to the ring gear housing 92 and front wall 96 of the housing by secured angles 97.

Referring to FIGS. 3–6, driving gear 86 meshes with ring gear 90 which is positioned by idler gears 98 and 100. The ring gear 90 is shown secured to rotatable box 101 which includes a continuous wall 102 having a continuous flange 103 extending normally to the plane of the continuous wall 102. The flange is secured to the ring by bolts 104. The wall 102 defines a rectangular passageway 114 dimensioned to closely accommodate the rectangular configuration of the vertically positioned carton upon entry. The body has another rectangular passageway 116 which long dimension is 90° from the long dimension of rectangular passageway 114. The overall configuration of the passageway is, therefore, generally cruciform. Such cruciform passageway allows a vertically oriented carton to be received every time the ring gear is rotated 90°. The cruciform passageway has four guide blocks 117, each of which has an inwardly tapered land 118 aligned with the long axis of passageway 114, and another inwardly tapered land 119 aligned with the long axis of passageway 116. Such tapered lands guide a vertical carton into the apparatus with each of the rectangular passageways.

When a first carton is moved into one of the rectangular passageways, as seen in FIG. 4, the presence of the carton actuates a microswitch 120 which closes the circuit to actuate driving gear 86 so that ring gear 90 is rotated 90° in the same rotational direction to the position generally shown in FIG. 5. The following vertical carton moving to the carton entry will force the rotated carton onto the conveyor system for passage through the sealing machine. The switch is positioned so it is intercepted by a vertically oriented carton, but is cleared by the lower profile of a longitudinally positioned carton.

The cartons may be seen in the views of FIGS. 4 and 5, and such carton is generally rectangular in shape, being four-sided with the bottom panel shown at 59 and the top panel or lid shown at 58. A closure flip 58a depends from top panel 58, and such closure flap includes an elongated tear strip 58b which is bonded to the front panel 59a. The top or minor end closure flap 20 and the bottom or major end closure flap 22 are shown at both opposite ends of the carton. When the carton is moved into the rectangular passageway, the bottom and top closure flaps are loosely closed.

When the rotated carton is moved out of the cruciform passageway by urging of the succeedingly introduced carton, such carton is deposited on the conveyor system between upper conveyor pair 54, 54a, and lower conveyor pair 56, 56a. The carton will be horizontally oriented and moved along such conveyors until the end closure flaps are contacted by a first set of plows in the path of carton movement. Looking at FIG. 7, the carton is moving in the direction of the arrow and is contacted by upper plow 124 secured to the housing by means such as bolts 126. Plow 124 is an angular shaped plate having a depending part which is modified to an elongated finger 128. This plow or finger holds overlapping side closure flaps 130 and 132 closed against the ice cream. Flap 130 is generally rectangular in shape and flap 132 is generally L-shaped. Both flaps have uncoated bonding areas 134 which together form a generally rectangular bonding area as shown. Also secured to the housing is an opening plow 140 which is generally tapered in a direction opposite to the direction of carton travel. The point 142 of the taper is bent outwardly so that it may better serve to plow open top or minor flap 20. Opening plow 140 has a top edge 140a to hold minor flap 20 horizontally open. Plow 140 also serves to hold side closure flaps 130 and 132 in closed position when planar portion 140b slidingly contacts the overlapped side closure flaps. Opening plow 140 includes an auxiliary opening plow 144 which is shown secured to a housing part 145 by a bolt 146 or the like. Auxiliary opening plow 144 has an angle 144a with a forward face 144b angled towards the closed side closure flaps. The angle is disposed to intercept the edge of major flap 22 to move such flap to open position, although board memory will tend to urge said flap open. The opened major flap 22 will then move under foot plate 144c which will hold such flap horizontally open.

The carton will then move along the upper and lower endless conveyor belts to the bonding material application station. The minor and major flaps at each carton end are opened substantially horizontal by the opening plows so that the carton with the opened flaps is substantially bilaterally symmetrical as indicated in FIG. 9. At the bonding application station, the glue pots apply hot melt bonding material in continuous lines to the inside surfaces between the opposed free ends of the major and minor flaps.

The glue pots on opposite sides of the conveyors are of similar construction and have similar operations. Detailed descriptions of one of the glue pots will apply equally to the other glue pot, and reference may be made to FIG. 10 for this purpose. The glue pot includes a bonding material reservoir or casing 162 which holds a supply of the hot melt material delivered from upper casing 164, which may be periodically replenished with hot melt. Heating elements or other means (not shown) are associated with casing 162 to maintain the hot melt in condition for application.

The casing 162 has two rotatably mounted rollers 168 and 172, one superimposed over the other. The rollers are aligned so that they have a common radial axis passing through both centers. Bottom roller 168 has a cylindrical surface, a portion whereof extends or projects through a window or aperture 170 at the bottom of the casing. Roller 172 likewise has a cylindrical surface, a portion whereof projects through aperture or window 174 in the top of the casing. Bottom roller 168 has a pair of circumferential wells in the cylindrical surface, one of the rows shown at 178 and the other at 180 in the view of FIG. 9. The top roller has a single circumferential row of wells which is indicated at 182. These wells pick up charges of the hot melt material in casing 162, and the excess hot melt material is removed from the cylindrical surfaces by doctor blades which, however, are not shown. These doctor blades are made of resilient metal and are normally biased against the cylindrical surfaces of the rollers. The plowed open flaps are moved into contact with the rollers at the application station where the hot melt is deposited. The top or minor flap 20 is held against the top roller by a resilient finger 185 with a slotted end 185a urged against the minor flap and top roller. The bottom or major flap 22 is held against the bottom roller by another resilient finger 186 with a slotted end 186a urged against the major flap and bottom roller. Fingers 185 and 186 are mounted to blocks 185b and 186b, respectively, which blocks are secured to housing parts.

The rollers 168 and 172 are rotated by endless chain 188 (FIG. 2) which turns around sprockets 190 and 191. Sprocket 191, in turn, turns sprocket 192, endless chain 198 and sprocket 200. Sprocket 200 rotates upper roller 172, and rotation of such roller transmits driving rotation by endless chain 206 to lower roller 168.

The hot melt bonding material is therefore deposited as two continuous lines of discrete hot melt particles on the inside of the lower or major flap 22, and as a single aligned row of discrete deposited particles on the inside of top or minor flap 20. The carton with the hot melt material deposited on the insides of the flaps is then moved along the conveyor system to a flap closing station (FIG. 8) at the opposite end of plow 140, which is indicated as mounted to the housing by a bracket 208. Plow 140 has a tapered back end 210, which taper follows the direction of carton travel. As the flaps ride down the low surfaces of the taper, they are urged towards closed position against the closed side flaps 130 and 132. The minor and major flaps are urged into closing position by intercepting closing plows 214 secured to the top of the housing at 216, and bottom plow plate 218 secured to the bottom of the housing at 220. Plow plates 214 and 218 have a tapered opening 222 which contacts the minor and major flaps and urges them into closed position as the carton closure flaps ride up the high surfaces of the plow plates 214 and 218.

After the minor and major flaps move past the tapered opening 222, they will be positioned behind plows 214 and 218 and against the side closure flaps. The conveyor will then deposit the carton at a compression station which includes a support 221 held by brackets 223 and 225 secured to the housing. A following carton will push the deposited carton between compression plates 227 and 229 which are held in spaced position by brackets 231 and 233 secured to the housing. The compression plates are spaced apart a distance sufficient to effect compressive contact with the carton ends until the hot melt bonding material sets and forms a bond. The sealed carton is then forceably discharged through the discharge or outlet end 35 of the apparatus by the following cartons deposited into the compression station.

In the previous embodiments, a method and apparatus has been indicated wherein bonding material is applied to the inside surfaces of both a top and bottom flap, one of which is a minor flap and the other is a major flap. The method may be used, however, to apply bonding material in different ways to end flaps which may additionally be differently designed.

Figure 13:
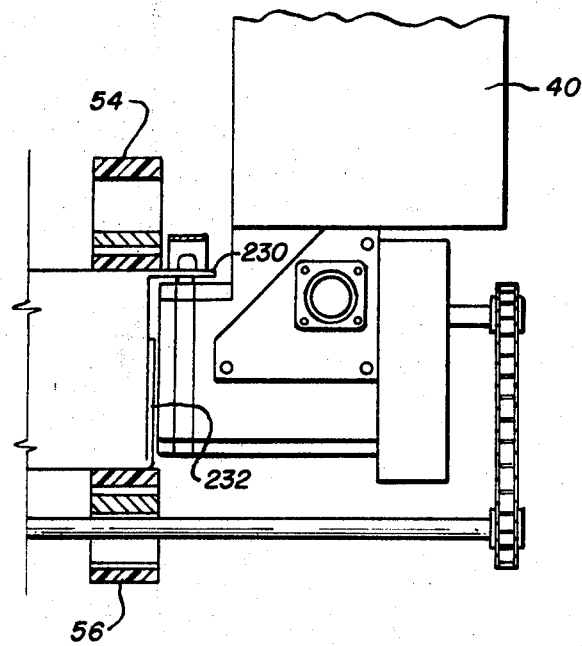
FIG. 13 is a portional side elevational view showing application of bonding material to the outside of a top flap of the carton shown in FIG. 12.

A modification with one possible variation in the design of the end flaps is indicated in the views of FIGS. 12–14. Such carton is provided with a top or minor flap 230 which is sufficiently long so that it will overlap the edge of the bottom or major flap 232. The carton moves past aligned upper and lower finger plows 234 and 236. The upper finger plow will tend to hold the upper flap 230 in closed position, as well as the underlying overlapping side closure flaps. Lower finger plow 236 will likewise tend to hold bottom flap 232 in closed position, as well as contributing to maintaining the overlapping side closure flaps in closed position.

An opening plow 238 has a tapered end 240 which is bent outwardly, similarly to tapered end 142 of plow 140. Such taper is disposed to move between the top flap 220 and the overlapping side closure flaps to plow the top flap into opened, horizontal position when the top flap rides to the top edge 242 of plow 238. Finger plow 236, however, will hold the bottom flap against the carton end so that it moves behind outwardly tapered end 240 of plow 238 as indicated in FIG. 12.

Bottom flap 232 will be held against the carton end as the carton moves past the bonding material application station as indicated in FIG. 13. The bonding applicator at such stations may be of similar construction to the one previously disclosed. In this method, however, only the inside surface of top flap 230 will receive a deposit of bonding material, the bottom flap being held against the carton end.

An alternative glue pot may be provided in which only a single roller is rotatably disposed to deposit hot melt to the inside surface of the top flap. After the bonding material has been applied to the inside surface of the top flap, the carton will move to a plow closing station as indicated in FIG. 14. This plow closing station is of a construction similar to that disclosed in FIG. 8. The top flap will ride down the low surface of the taper provided in flap closing plow 244. The top flap 230 will therefore be plowed into overlapping relationship with the bottom flap 232 so that the hot melt material applied to the inside surface of flap 230 contacts the outside surface of flap 232. The carton with the closed flap ends is then deposited into a compression station as before.

While the use of rollers for depositing hot melt is highly desirable, it should be understood that advantages of the invention are still realized by using other means to apply the bonding material to the ends of the carton. Looking now at FIGS. 15–18, an injection nozzle system is illustrated for applying hot melt in a variety of ways to cartons with different end closure flaps. In FIG. 15, the bilaterally symmetrical carton, with opened minor and major closure flaps, is conveyed to a bonding material application station in which a hot melt ejection dispenser 250 has an upper nozzle 252 slightly spaced from the inside surface of top or minor flap 254; and which has a pair of bottom nozzles 256 and 258 slightly spaced from the inside surface of bottom or major flap 260. The hot melt is conveyed to the dispenser under pressure along line 262 to eject deposits of hot melt in timed and metered amounts so that said hot melt is applied in substantially continuous and parallel lines to the inside surfaces of the major and minor flaps. The carton of FIG. 15 is similar to the carton disclosed in FIGS. 1–11, and the bonding material is deposited in the same places on similar end closure flaps, but by different means.

The carton shown in FIG. 16 is similar to the carton shown in FIG. 15. In this embodiment, an ejector 266 deposits hot melt material from nozzles 268, 270 and 272, all of which are slightly spaced from the overlapping side closure flaps of the carton. The hot melt material is deposited in a substantially continuous line from nozzle 272 to the top of the overlapping side closure flaps so that such hot melt may contact the inside surface of minor flap 274. Nozzles 268 and 270 deposit hot melt material in parallel, substantially continuous lines to the overlapping side closure flaps in position to contact the inside surface of major flap 276.

FIGS. 17 and 18 show a carton with end closure flaps similar to the carton indicated in FIGS. 12–14. A dispenser 280 ejects hot melt under pressure from nozzle 282 spaced slightly from the inside surface of minor flap 284. The hot melt is deposited in a substantially continuous line, and then such top flap is plowed into overlapping relationship with the major flap 286, whereupon the hot melt material on the inside surface of flap 284 contacts the outside surface of major flap 286. In FIG. 18, a dispenser nozzle 288 is slightly spaced from major flap 290, and such nozzle ejects hot melt material in a substantially continuous line to the outside surface of the major flap. The minor flap 292 is then plowed closed in overlapping relationship with major flap 290 so that the inside surface of the minor flap contacts the deposited hot melt material on the outside surface of major flap 290. In the foregoing descriptions of FIGS. 15–18, it is understood that the application of hot melt material and the manipulation of the end closure flaps is occurring at both opposite ends of the cartons, although the description concerned only one end thereof.

Although particular embodiments of the invention have been shown and described in full here, there is no intention to thereby limit the invention to the details of such embodiments. On the contrary, the intention is to cover all modifications, alternative embodiments, usages and equivalents of the method and apparatus for sealing cartons as fall within the spirit and scope of the invention, specification and appended claims.

What is claimed is:

1. A method of sealing the opposite ends of a carton having a set of closure flaps at each end, each set having a top flap, a bottom flap, and a pair of side flaps, including the steps of
receiving a vertically positioned carton having the set of flaps at least at the bottom loosely folded to a closed position, said carton having deposited contents,
rotating the loaded carton about 90° to a substantially horizontal position,
moving at least one of the top and bottom closure flaps at each end to substantially horizontal positions,
holding the side closure flaps in closed and overlapping positions at the ends of the carton,
applying a substantially continuous line of bonding material at both ends of the carton to provide bonding of the top and bottom closure flaps to the ends of the carton,
moving said horizontally positioned closure flaps to bonding engagement against the closed side closure flaps, and
holding the moved closure flaps in such closed position until the bonding material is set.

2. A method which includes the steps of claim 1 wherein the top and bottom closure flaps at each end are moved to substantially horizontal positions so that said carton is substantially bilaterally symmetrical, the bonding material is applied simultaneously to each of the insides of the top and bottom closure flaps, and wherein said substantially continuous line of bonding material is deposited as a plurality of discrete and aligned hot melt deposits.

3. A method which includes the steps of claim 1 which includes further providing relative movement between the carton and opening plow means between the top and bottom closure flaps to plow the top and bottom closure flaps to the substantially horizontal opened position, and providing relative movement between the carton and closing plow means to plow the opened top and bottom closure flaps to closed position.

4. A method which includes the steps of claim 1 wherein said carton is loaded with ice cream or the like and said carton is delivered to a rotating station in a substantially vertical position with the top and bottom end flaps being loosely closed against the ice cream within the carton, said carton being rotated at said rotating station about 90° to a substantially horizontal position, said substantially horizontally positioned carton being advanced to a top and bottom flap opening station where said top and bottom flaps are intercepted and urged to said substantially horizontal position, holding said top and bottom flaps in the opened position by said interceptive means, moving said carton through a flap closing station, following application of bonding material, where closing means intercept and close said top and bottom closure flaps, and moving said carton through a compression station wherein means hold the top and bottom closure flaps in closed position so that the hot melt material sets at an accelerated rate through contact with the lower temperature from the carton paperboard.

5. A method which includes the steps of claim 4 wherein the bottom closure flap extends above the midline of the horizontally positioned carton and the top flap terminates short of said midline, and wherein the substantially continuous line of bonding material is applied to the inside of the top closure flap and to the inside of the bottom closure flap, said applications being made simultaneously to the inside of the closure flaps of both opposite ends.

6. A method which includes the steps of claim 4 wherein one of the top and bottom closure flaps overlaps the other one of said top and bottom closure flaps, and wherein the substantially continuous line of bonding material is applied to the inside of the overlapping closure flap in position to be contacted by the outside of the overlapped closure flap.

7. A method which includes the steps of claim 4 wherein the bottom closure flap extends above the midline of the horizontally positioned carton and the top flap terminates short of said midline, and wherein a plurality of substantially continuous bonding lines are applied to the outside surfaces of the overlapping side closure flaps in position to be contacted by the inside surfaces of the top and bottom closure flaps.

8. A method which includes the steps of claim 4 wherein one of the top and bottom closure flaps overlaps the other one of said top and bottom closure flaps, and wherein the substantially continuous line of bonding material is applied to the outside of the overlapped closure flap in position to be contacted by the inside surface of the overlapping closure flap.

9. A method which includes the steps of claim 1 wherein the carton is loaded with ice cream or the like, said carton being moved along a path through a rotating station, a flap opening plowing station, a bonding material application station, a flap closing plowing station, and a compressing station, the appearance of said vertically positioned carton at the rotating station associated with actuating rotation to said substantially horizontal position, the movement of said carton through said flap opening plowing station resulting in said top and bottom closure flaps being moved to a substantially horizontal position, said continuous lines of bonding material being applied simultaneously as said carton moves through said bonding station, said top and bottom closure flaps being moved to closed position as said carton moves through the flap closing plowing station, and then moving said carton into said compressing station, in which the width of the path is about the horizontal length of said carton.

10. An apparatus for receiving a carton with a set of closure flaps at each opposite end, each set of flaps including a top and bottom flap, and a pair of side overlapping flaps, including
a conveyor to advance the carton along a path,
means to receive and hold a vertically positioned carton with closure flaps at the top and bottom being loosely closed,
means to rotate the receiving and holding means so that the carton is turned substantially 90° to a substantially horizontal position,
means movable between at least one of the top and bottom end closure flaps to force at least one of said top and bottom closure flaps to a substantially horizontal position and to hold said side closure flaps in overlapping and closed position,
means to apply bonding material in a substantially continuous line to the ends of the cartons,
means to close the opened flaps, and
means to compress such closed flaps against the overlapping side flaps until the bonding material has set.

11. An apparatus which includes the elements of claim 10, in which said movable means is moved between the top and bottom closure flaps to force said top and bottom closure flaps to substantially horizontal positions, and which further includes a housing, a carton entry at one end of the housing, and carton discharge at the opposite end of the housing, said conveyor being endless and being disposed between the entry and discharge, and means to drive said conveyor, and said endless conveyor having a width sufficiently great to accommodate the long axis of the carton after it has been rotated to its horizontal position.

12. An apparatus which comprises the elements of claim 11 wherein the means to rotate said carton includes a ring gear with idler gears and a driving gear providing mounting points for said ring gear, a carton receiving passageway in said ring gear, and means to actuate the driving gear to rotate said ring gear substantially 90° when the carton is delivered into said ring gear passageway.

13. An apparatus which comprises the elements of claim 12 wherein said ring gear passageway is generally cruciform to accommodate a vertically oriented carton after each 90° rotation.

14. An apparatus which comprises the elements of claim 11 wherein the means to force open the top and bottom closure flaps at opposite ends are opening plows with tapered ends, said plows secured to opposite sides of the housing and disposed in the path of travel of said carton to intercept the insides of the top and bottom end flaps, the ends being tapered in opposite directions, a forward tapered end directed in a direction opposite to the direction of travel of said carton to urge opening of the flaps, a rearward taper in a direction common to the direction of carton travel to guide closing of the flaps, closing plows including a pair of tapered plates secured to each end of the housing, and each tapered plate in the pair being spaced and positioned to intercept the outsides of the closure flaps following application of the bonding material, and to urge said flaps to closed position.

15. An apparatus which includes the elements of claim 11 wherein the means to apply the bonding material includes a pair of aligned bonding material pots mounted to the housing, each pot including a rotatable roller and a window through which portions of the cylindrical roller surface projects, said window being positioned so that an opened closure flap contacts such cylindrical surface in the movement of the carton past the pots, and the surface of said roller having a continuous line of spaced wells to hold hot melt bonding material picked up from a supply of hot melt within the pots, whereby the inside surfaces of said contacted closure flaps receive deposits of discrete hot melt material as the carton moves past such pots.

16. An apparatus which includes the elements of claim 15 wherein each pot includes a second roller superimposed relative to said other roller, a second window through which portions of said second roller surface projects, the surface of said second roller having a continuous line of spaced wells to hold hot melt bonding material picked up from a supply of hot melt within the pots, and said windows being opposed, whereby the inside surfaces of said top and bottom closure flaps receive deposits of discrete hot melt material as the carton moves past such pots.

17. An apparatus which comprises the elements of claim 11 wherein the carton discharge end includes compression walls spaced apart a sufficient distance to accommodate the horizontal length of the carton, whereby the closed ends at opposite ends of the carton are compressed until the applied bonding material forms a bond.

18. An apparatus for sealing ice cream cartons or the like, said carton having a set of closure flaps at each of the opposite ends including a top flap, a bottom flap, and overlapping side flaps, said apparatus including
 a housing, a carton entry at one end of said housing, and a carton discharge at the opposite end of the housing,
 an endless conveyor intermediate said entry and discharge for conveying cartons through the housing,
 a rectangular passageway associated with said carton entry end to receive a loaded carton in vertically oriented position,
 means associated with said carton entry end to receive the vertically oriented carton and to rotate said carton 90° to a horizontal position, and means to actuate said rotation means after receiving the vertically oriented carton,
 flap opening plow means mounted within said housing at opposite sides of said endless conveyor to move between the top and bottom flaps at both opposite ends of the carton as the carton advances, said flap opening plow means moving the top and bottom flaps to substantially horizontal positions so that such horizontally positioned carton is bilaterally symmetrical with such opened flaps,
 hot melt bonding material applicators mounted within said housing, said applicators having means positionable between the opened flaps to deposit the hot melt bonding material in a substantially continuous line to the inside surfaces of the top and bottom flaps,
 flap closing plow means mounted within said housing at opposite sides of said conveyor to intercept the top and bottom flaps of the carton after application of the bonding material to move such flaps to closed position against the overlapping side flaps, and
 spaced compression walls towards the discharge end of the housing to hold the closed top and bottom flaps in compressed position to allow the hot melt bonding material to set.

19. An apparatus which includes the elements of claim 18 wherein the flap opening plow means for each end of the carton includes a plate, said plate being tapered towards a direction opposite to the direction of carton travel at the forward end, and being tapered in the same direction as carton travel at the rearward end, and said flap closing plow means for each end of the carton including spaced upper and lower plates defining an inlet tapered in the same direction as carton travel to gradually close said top and bottom flaps.

20. An apparatus which includes the elements of claim 18 wherein the means to rotate the carton 90° to a horizontally oriented position includes a rotatable gear ring, a cruciform passageway within said gear ring to receive a vertically oriented carton following each 90° rotation, switch means associated with said cruciform passageway to be intercepted by a vertically oriented carton to actuate the ring gear a predetermined degree to turn the carton substantially 90° to a horizontally oriented position, and said horizontally positioned carton being urged into said conveyor by a following vertically oriented carton, a low profile of the horizontal carton clearing said switch means as the horizontally positioned carton is advanced along said endless conveyor.

21. An apparatus which includes the elements of claim 18 wherein said hot melt applicators include a hot melt reservoir casing and a roller rotatably driven within said hot melt casing, said roller having a cylindrical surface with a plurality of continuous wells which pick up the hot melt material during rotation of the rollers, and a window opening in the hot melt casing to expose wells on the cylindrical surface of the roller to thereby deposit a continuous line of hot melt material to the outside of a flap.

References Cited
UNITED STATES PATENTS

| 1,912,696 | 6/1933 | Ferguson | 53—392 X |
| 3,302,365 | 2/1967 | Currie | 53—374 X |
| 3,420,037 | 1/1969 | Villemure et al. | 53—374 X |

TRAVIS S. McGEHEE, Primary Examiner

U.S. Cl. X.R.

53—374